July 29, 1930.   H. N. DAVOCK   1,771,671
RAMP STRUCTURE
Filed June 1, 1929

INVENTOR
Harlow N. Davock
BY
Pennie Davis Marvin & Edmonds
ATTORNEYS

Patented July 29, 1930

1,771,671

UNITED STATES PATENT OFFICE

HARLOW N. DAVOCK, OF BIRMINGHAM, MICHIGAN

RAMP STRUCTURE

Application filed June 1, 1929. Serial No. 367,772.

This invention relates to ramp structures for garages and has for its object to provide a ramp structure particularly adapted for a garage building of moderate size which will afford easy access to the various floors of the building with a minimum deduction from the storage space of the floors for ramps and aisles.

A further object of the invention is to provide a ramp structure of the class described which may be constructed at a cost but little greater than would be involved in providing the same area of ordinary floor space.

In the accompanying drawings I have illustrated a garage building of my preferred construction, and in said drawings.

Figure 1:
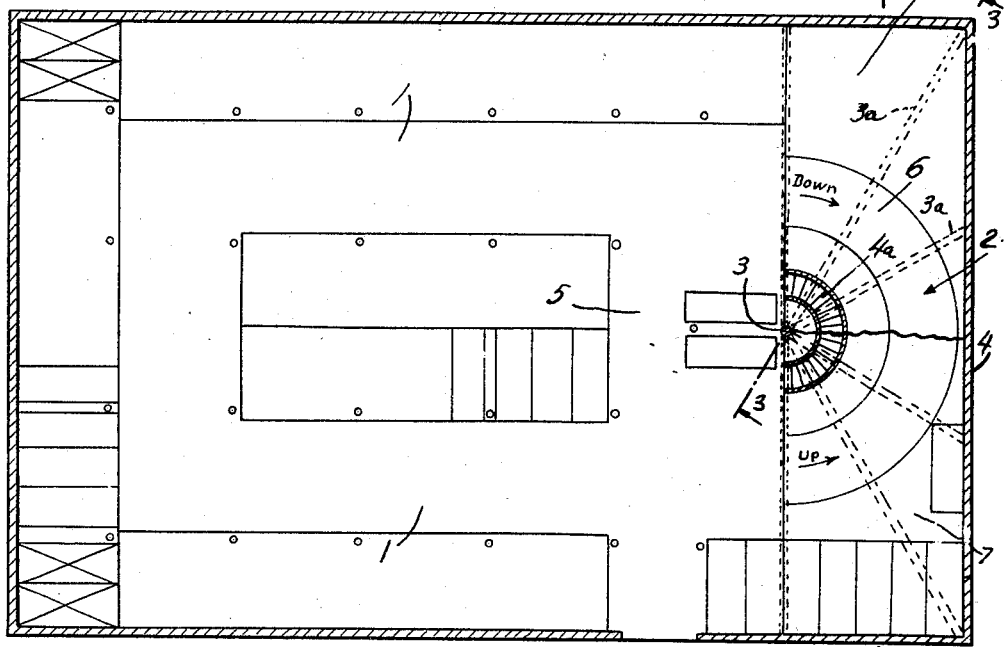
Fig. 1 is a plan view showing a floor of a building having my improved ramp.

In the drawings the building disclosed in Fig. 1 is designed for a lot one hundred feet wide. This is a common dimension for city lots which usually run two hundred feet or three hundred feet to the block. This width of building permits four rows of cars to be stored with their long axes extending transversely of the building as shown in Fig. 1, and also allows two aisles of sufficient width, the aisles being arranged between the outer rows of cars and the middle rows.

By this arrangement the aisles indicated at 1 terminate opposite the path of movement of the cars on the ramp indicated generally at 2. The ramp provided in this building is a semicircular spiral ramp whose center is a column 3 spaced from the adjacent wall 4 of the building by a distance equal to the radius of the spiral, which in turn must be at least as great as the turning radius of the largest cars which the garage is intended to house. The pitch of the ramp is determined, of course, by the ceiling heights of the various floors. With a 12-foot ceiling, which is ample, the grade at a point corresponding with the middle of the aisles will be about 15%. Near the center of course the grade is steeper, but the turning radius of the automobile limits the path taken on the ramp and for even the smallest turning radius of automobiles as built today, a ramp making a rise of one floor in a half turn will not be too steep to climb.

The space at the center of the spiral where the grade is too steep may preferably be used for stairs as indicated at $4^a$, and between the stairs and the first cars of the middle rows I preferably leave an aisle space 5 for the passage of cars from one ramp section to another.

The distinguishing feature of the ramp of the present application is that the ramp occupies the entire end of the building between the center column 3 and the wall 4. The floor in this portion of the building extends from one floor to the next floor above, the surface of the ramp being generated by a line revolving about the column 3 and simultaneously rising vertically at a rate to move from one floor level to the next floor above during a half turn around the center of the column 3.

Figure 2:
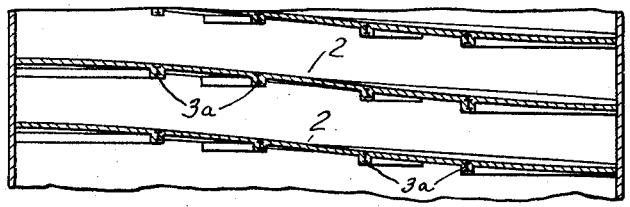
Fig. 2 is a section on line 2—2 of Fig. 1.
Figure 3:
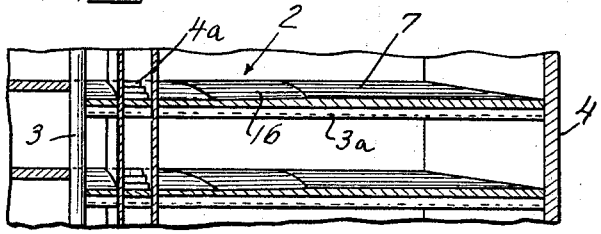
Fig. 3 is a section on line 3—3 of Fig. 1.

Otherwise stated, the surface of the ramp is level in a direction radial to the column 3 as indicated in Fig. 3, which is a section on line 3—3 of Fig. 1, and will present a uniform grade to a car traveling in a circle about the column 3 as a center, the grade being steeper near the center and flatter at greater distances therefrom, as indicated by Fig. 2, which is a section on line 2—2 of Fig. 1.

As shown in Fig. 1, the ramp is supported on the central column 3 by radial girders $3^a$ extending to the side and end walls of the building. The driveway of the ramp will preferably be formed of a slab of reinforced concrete which may be conveniently constructed by running the reinforcing fabric from girder to girder in the path above described.

As pointed out above, the pitch of the spiral at a distance from the center of the spiral such as to be followed by a car of average turning radius, does not present a grade which is too steep to be readily climbed by the car. This portion of the ramp, which I have indicated at 6, and which is in line with the aisles of the floor, will be kept clear for the passage of cars from one floor to another. This portion of the ramp is preferably banked as shown in Fig. 3 to provide some compensation for the centrifugal force of the cars moving in a curved path up and down the ramp. Beyond the portion 6 of the ramp the surface of the ramp may be flat, as indicated at 7, Figs. 2 and 3, and this portion of the ramp may be readily used for parking cars. As stated above, the slant or inclination of the ramp becomes less at greater distances from the center of the ramp and beyond the path 6 the slope of the ramp is not too great for the cars to be held in place by their brakes in the usual manner without chocking the wheels. This portion of the ramp may thus be utilized for "live" storage, the cars being as readily gotten in and out the garage as the cars from the several floors of the building.

Figure 4:
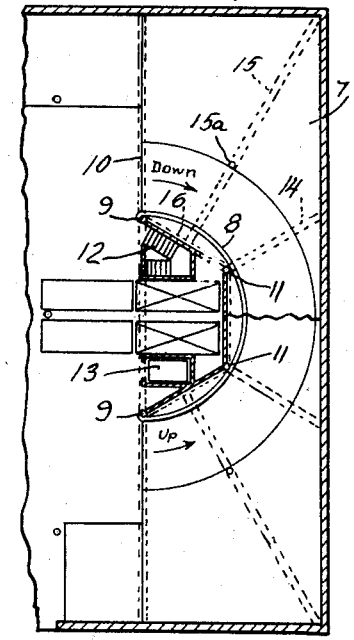
Fig. 4 is a plan view of a modification.

In Fig. 4 I have illustrated a construction wherein the central portion of the ramp within the path 6 may also be utilized for the storage of cars.

Instead of extending the supporting beams for the ramp radially from the central column 3 to the walls of the building as shown in Fig. 1, I substitute for the column 3 a series of columns positioned just inside the curbing 8 which marks the inner boundary of the path 6. Two of these columns 9 are in the line 10 which divides the ramp portion of the floor from the floor proper, the other two columns 11 being positioned at intermediate points along the curb 8. The floor within the boundary thus defined by these columns is level and forms a continuation of the garage floors, thereby providing parking space for several cars, as indicated, and also space for the stairs 12 and elevator shaft 13 which would otherwise take up space rentable for storage.

To support the ramp floor in this structure, girders 14 are provided extending from the columns 11 to the end walls of the garage. The other girders 15 which support the floor of the ramp preferably extend from the corners of the building to short girders 16 extending between the columns 9 and 11 at the proper level, as determined by the pitch of the ramp. If desired other columns, indicated at 15ª, may be employed to support the girders at an intermediate point, but I preferably make the girders 16 heavy enough to require no intermediate support, so as to leave the entire portion 7 of the ramp clear to facilitate handling cars thereon.

If through changes in the price of real estate or for other cause it no longer becomes desirable to use the building as a garage, it may be readily converted into an ordinary building having its entire floor surface in the same plane. The inclined floor of the garage must of course be removed and also the supporting girders which lie in planes intermediate the floor levels. The supporting columns, however, need not be disturbed, but will be utilized to support suitable girders extending in the same plane with the girders of the floor proper.

By providing an aisle space as indicated at 5 so that the cars traveling a distance or more than one floor will move continuously in the same direction without altering the adjustment of steering wheels, a rapid ingress and egress of cars is provided with a minimum reduction in the rentable floor space, as will be obvious from an inspection of Fig. 1.

The objection to ramps in buildings of small size as heretofore constructed has been the large amount of space rendered unavailable for live storage by reason of the ramp structure. That is to say, in a small garage the amount of rentable space lost by reason of the ramp structure is relatively much greater than the percentage of space rendered unavailable in a larger building. In fact, not only is the percentage of space lost greater, but the actual space rendered unusable is greater because the ramp has to be at least large enough in diameter to permit the travel of the cars on the turning radius for which they are designed, and in a small building the space between the outside of the ramp and the walls of the building is too small to permit maneuvering the cars where the cars cannot pass directly from the ramp to the floor at any point along its rise. With my improved construction the only space actually lost is the path 6 and the cross aisle 5, the other aisles of course being required whether elevators or ramps are employed.

I claim:

1. In a garage building a plurality of horizontal floors for the storage of cars, said floors occupying the cross-sectional area of the building except a portion at one end thereof extending from side wall to side wall of the building, a ramp structure occupying the end of the building between the said horizontal floors and the end wall, said ramp structure comprising a pathway curved in a half spiral from one floor to the other, and floor portions beyond the pathway having their surfaces lying in planes constituting radial extensions of the spiral.

2. In a garage building a plurality of horizontal floors for the storage of cars, said floors occupying the cross-sectional area of the building except a portion at one end thereof extending from side wall to side wall of the building, a ramp structure occupying the end of the building between said horizontal floors and the end wall, comprising a series of vertically superimposed floor sections extending in half spirals between adjacent horizontal floors and also extending to the end and side walls of the building.

3. In a garage building, a plurality of horizontal floors for the storage of cars, said floors occupying the cross-sectional area of the building except a portion at one end thereof extending from side wall to side wall of the building, a ramp structure occupying the end of the building between said horizontal floors and the end wall, comprising a series of vertically superimposed floor sections extending in half spirals between adjacent horizontal floors and also extending to the end and side walls of the building, said floor sections having a surface contour to provide a banked pathway concentric with the axis of the spiral and unbanked portions extending from the circumference of said pathway to the walls of the building.

4. In a garage building, a plurality of horizontal floors for the storage of cars, said floors occupying the cross-sectional area of the building except a portion at one end thereof extending from side wall to side wall of the building, a ramp structure occupying the end of the building between the said horizontal floors and the end wall, comprising a series of vertically superimposed floor sections extending in half spirals between adjacent horizontal floors and also extending to the end and side walls of the building, each superimposed floor section consisting of a single slab of reinforced concrete containing supporting girders extending in the radial lines of the spiral.

In testimony whereof I affix my signature.

HARLOW N. DAVOCK.

CERTIFICATE OF CORRECTION.

Patent No. 1,771,671. Granted July 29, 1930, to

HARLOW N. DAVOCK.

It is hereby certified that error appears in the printed specification of the above numbered patent requiring correction as follows: Page 2, after line 102, insert the following paragraph:

> The term "end of the building" employed in the appended claims is intended to include any portion of the building bounded by portions of two opposite walls and a connected wall with the ramp structure filling the area bounded by the three wall portions.;

and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.